(12) United States Patent
Österlund et al.

(10) Patent No.: US 11,734,171 B2
(45) Date of Patent: Aug. 22, 2023

(54) SNAPSHOT AT THE BEGINNING MARKING IN Z GARBAGE COLLECTOR

(71) Applicant: Oracle International Corporation, Redwood Shores, CA (US)

(72) Inventors: Erik Österlund, Västerhaninge (SE); Per Liden, Stockholm (SE); Stefan Mats Rikard Karlsson, Nacka (SE)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 17/303,635

(22) Filed: Jun. 3, 2021

(65) Prior Publication Data

US 2022/0374393 A1 Nov. 24, 2022

Related U.S. Application Data

(60) Provisional application No. 63/190,621, filed on May 19, 2021, provisional application No. 63/190,617, (Continued)

(51) Int. Cl.
*G06F 12/02* (2006.01)
*G06F 5/01* (2006.01)
(Continued)

(52) U.S. Cl.
CPC ............ *G06F 12/0253* (2013.01); *G06F 5/01* (2013.01); *G06F 11/1068* (2013.01); (Continued)

(58) Field of Classification Search
CPC .............. G06F 16/128; G06F 12/0253; G06F 11/1068; G06F 5/01; G06F 12/0269
See application file for complete search history.

(56) References Cited

U.S. PATENT DOCUMENTS

| 5,765,007 A | 6/1998 | Rahman et al. |
| 5,873,104 A | 2/1999 | Tremblay et al. |

(Continued)

FOREIGN PATENT DOCUMENTS

| JP | 4265610 B2 | 5/2009 |
| WO | 00/29937 A2 | 5/2000 |

OTHER PUBLICATIONS

A concurrent, generational garbage collector for a multithreaded implementation of ML by Doligez (Year: 1993).

(Continued)

*Primary Examiner* — Eliyah S. Harper
(74) *Attorney, Agent, or Firm* — Invoke

(57) ABSTRACT

During execution of garbage collection marking, an application thread receives a first request to overwrite a reference field of an object, the object comprising at least a first reference and the first request comprising a second reference to be written to the reference field. Responsive to receiving the first request, the application thread determines a marking parity for objects being traversed by the garbage collection marking process and loads the first reference from the heap. The application thread determines that marking metadata of the first reference does not match the marking parity. Responsive to that determination, the application thread adds the first reference to a marking list, modifies the second reference to include the current marking parity as the marking metadata, and stores the modified second reference to the first reference field. In subsequent writes to the reference field, the application thread refrains from adding to the marking list.

21 Claims, 9 Drawing Sheets

Related U.S. Application Data filed on May 19, 2021, provisional application No. 63/190,625, filed on May 19, 2021.

(51) Int. Cl.
  *G06F 11/10* (2006.01)
  *G06F 16/11* (2019.01)

(52) U.S. Cl.
  CPC ...... *G06F 12/0238* (2013.01); *G06F 12/0261* (2013.01); *G06F 12/0269* (2013.01); *G06F 12/0276* (2013.01); *G06F 16/128* (2019.01); *G06F 2212/702* (2013.01); *G06F 2212/7207* (2013.01)

(56) References Cited

U.S. PATENT DOCUMENTS

| | | | |
|---|---|---|---|
| 5,928,357 | A | 7/1999 | Underwood et al. |
| 6,304,949 | B1 | 10/2001 | Houlsdworth |
| 6,769,004 | B2 | 7/2004 | Barrett |
| 7,089,272 | B1 | 8/2006 | Garthwaite et al. |
| 7,389,395 | B1* | 6/2008 | Garthwaite ......... G06F 12/0253 711/E12.009 |
| 7,404,182 | B1 | 7/2008 | Garthwaite et al. |
| 7,539,837 | B1 | 5/2009 | Flood et al. |
| 7,546,587 | B2 | 6/2009 | Marr et al. |
| 9,323,608 | B2 | 4/2016 | Troia |
| 10,795,812 | B1* | 10/2020 | Duggal ................ G06F 3/067 |
| 10,929,288 | B1* | 2/2021 | Moore ................ G06F 12/0804 |
| 10,983,908 | B1* | 4/2021 | Zou ..................... G06F 12/0253 |
| 2004/0186863 | A1 | 9/2004 | Garthwaite |
| 2004/0187102 | A1 | 9/2004 | Garthwaite |
| 2005/0235006 | A1 | 10/2005 | Adl-Tabatabai et al. |
| 2010/0114998 | A1 | 5/2010 | Steensgaard et al. |
| 2013/0073821 | A1* | 3/2013 | Flynn ..................... G11C 16/06 711/E12.103 |
| 2013/0227236 | A1* | 8/2013 | Flynn .................. G06F 12/0292 711/172 |
| 2014/0310235 | A1 | 10/2014 | Chan et al. |
| 2015/0081996 | A1 | 3/2015 | Flood |
| 2015/0227416 | A1 | 8/2015 | Reinart |
| 2018/0365106 | A1* | 12/2018 | Huang .................... G06F 3/064 |
| 2020/0012600 | A1 | 1/2020 | Konoth et al. |
| 2020/0026781 | A1* | 1/2020 | Khot ..................... G06F 16/164 |
| 2020/0081748 | A1 | 3/2020 | Johnson et al. |
| 2020/0125364 | A1 | 4/2020 | Osterlund |
| 2020/0250084 | A1* | 8/2020 | Stephens ............. G06F 12/0253 |
| 2020/0310963 | A1 | 10/2020 | Nilsen |
| 2020/0379902 | A1 | 12/2020 | Durham et al. |
| 2022/0138098 | A1 | 5/2022 | Osterlund et al. |

OTHER PUBLICATIONS

A Hardware Accelerator for Tracing Garbage Collection by Maas (Year: 2018).

Generational Garbage Collection, Write Barriers/Write Protection and userfaultfd(2) by Cracauer (Year: 2016).

Getting started with Z Garbage Collector(ZGC) in Java 11 [Tutorial] by Davis (Year: 2019).

JEP 333: ZGC: A Scalable Low-Latency Garbage Collector(Experimental) by Liden and Karlsson (Year: 2020).

Mostly Concurrent Garbage Collection Revisited by Barabash (Year: 2003).

Write Barrier Elision for Concurrent Garbage Collectors by Vechev (Year: 2004).

"ZGC—Generations Revision 2," accessed at https://wiki.se.oracle.com/display/JPG/ZGC+-+Generations+Revision , Feb. 1, 2020, pp. 6.

Click et al.; "The Pauseless GC Algorithm", VEE 05, Jun. 11-12, 2005, Chicago, Illinois, USA. Copyright 2005 ACM 1-59593-047-7/05/0006 . . . S5.00.

David Gnedt, "Fast Profiling in the HotSpot Java VM with Incremental Stack Tracing and Partial Safepoints," Faculty of Engineering and Natural Sciences, 2014, 57 pages.

Domani et al., "Implementing an On-the-fly Garbage Collector for Java," ACM SIGPLAN Notices, vol. 36, No. 1, 2000, pp. 155-166.

Kliot et al., "A Lock-Free, Concurrent, and Incremental Stack Scanning for Garbage Collectors," in Proceedings of the ACM SIGPLAN/SIGOPS International Conference on Virtual Execution Environments (VEE '09), 2009, pp. 11-20.

Main—Main—OpenJDK Wiki, Created by Iris Clark, last modified by Per Liden, available online at <URL: https://wiki.openjdkjava.net/display/zgc/Main>, Oct. 15, 2020, 9 pages.

Open JDK, "HotSpot Glossary of Terms", 2006, Sun Microsystems, available at <https://openjdk.java.net/groups/hotspot/docs/HotSpotGlossary.html>, 6 pages.

Osterlund et al., "Block-Free Concurrent GC: Stack Scanning and Copying," International Symposium on Memory Management, vol. 51, 2016, 12 pages.

Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.

Robbin Ehn, "JEP 312: Thread-Local Handshakes," Hotspot Dash Dev at Openjdk Dot Java Dot Net, available at <http://openjdkjava.net/jeps/312>, 2018, 3 pages.

Tene et al.; C4: The Continuously Concurrent Compacting Collector ISMM'11, Jun. 4-5, 2011, San Jose, CA, USA Copyright 2011, ACM 978-M503-0263-0/11/06 . . . $10.00.

The Z Garbage Collector—Low Latency GC OpenJDK, available online at <http://cr.openjdk.java.net/~pliden/slides/ZGC-Jfokus-2018.pdf>, 2018, 96 pages.

Wilson, P.R., et al., "A "Card-making" scheme for controlling intergenerational differences in generation—based garbage collection on stock hardware," ACM SIGPLAN Notices, vol. 24, Issue 5, May 1989, pp. 87-92.

Yang et al., "Improving Program Locality in the GC using Hotness," PLDI' 20, pp. 301-313, Jun. 15-20, 2020.

Yuasa et al., "Return Barrier," International Lisp Conference, 2002, 12 pages.

Yuasa, T., "Real-time garbage collection on general-purpose machines," Journal of Systems and Software, vol. 11, Issue 3, <arch 1990, pp. 181-198.

ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.

"Lazy Compaction", Retrieved from https://wiki.se.oracle.com/display/JPG/Lazy+Compaction, Retrieved on Sep. 20, 2022, 2 Pages.

Pufek et al., "Analysis of Garbage Collection Algorithms and Memory Management in Java", 2019 42nd International Convention on Information and Communication Technology, Electronics and Microelectronics (MIPRO), Croatian Society MIPRO, May 20, 2019, pp. 1677-1682.

Yang et al., "Deep Dive into ZGC: A Modern Garbage Collector in OpenJDK", ACM Transactions on Programming Language and Systems, ACM, New York, NY, 2022, vol. 44, No. 4, 34 Pages.

\* cited by examiner

SNAPSHOT AT THE BEGINNING MARKING IN Z GARBAGE COLLECTOR

INCORPORATION BY REFERENCE; DISCLAIMER

The following applications are hereby incorporated by reference: Application No. 63/190,617 filed on May 19, 2021; Application No. 63/190,621 filed on May 19, 2021; Application No. 63/190,625 filed on May 19, 2021. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to garbage collectors. In particular, the present disclosure relates to an optimized snapshot at the beginning (SATB) marking process.

BACKGROUND

A compiler converts source code, which is written according to a specification directed to the convenience of the programmer, to machine code (also referred to as "native code" or "object code"). Machine code is executable directly by a physical machine environment. Additionally or alternatively, a compiler converts source code to an intermediate representation (also referred to as "virtual machine code/instructions"), such as bytecode, which is executable by a virtual machine that is capable of running on top of a variety of physical machine environments. The virtual machine instructions are executable by the virtual machine in a more direct and efficient manner than the source code. Converting source code to virtual machine instructions includes mapping source code functionality, according to the specification, to virtual machine functionality, which utilizes underlying resources (such as data structures) of the virtual machine. Often, functionality that is presented in simple terms via source code by the programmer is converted into more complex steps that map more directly to the instruction set supported by the underlying hardware on which the virtual machine resides.

A virtual machine executes an application and/or program by executing an intermediate representation of the source code, such as bytecode. An interpreter of the virtual machine converts the intermediate representation into machine code. As the application is executed, certain memory (also referred to as "heap memory") is allocated for objects created by the program. A garbage collection system may be used to automatically reclaim memory locations occupied by objects that are no longer being used by the application. Garbage collection systems free the programmer from having to explicitly specify which objects to deallocate. Generational garbage collection schemes are based on the empirical observation that most objects are used for only a short period of time. In generational garbage collection two or more allocation regions (generations) are designated, and are kept separate based on ages of the objects contained therein. New objects are created in the "young" generation that is regularly collected, and when a generation is full, the objects that are still referenced by one or more objects stored in an older-generation region are copied into (i.e., "promoted to") the next oldest generation. Occasionally a full scan is performed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
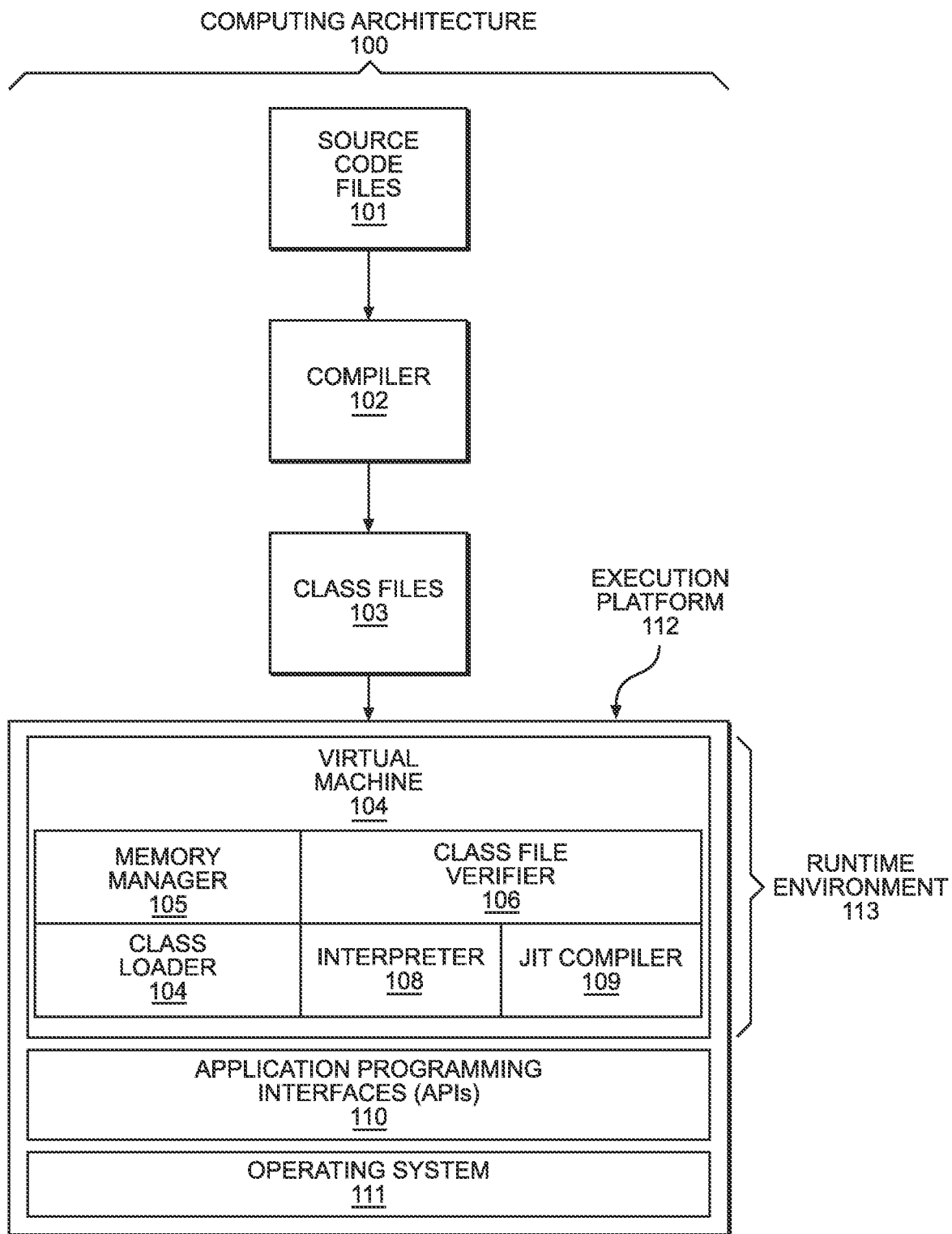
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GARBAGE COLLECTION
4. LOAD AND WRITE BARRIERS
5. USING A WRITE BARRIER WHEN WRITING A HEAP REFERENCE BY AN APPLICATION THREAD TO IMPROVE A SNAPSHOT-AT-THE-BEGINNING (SATB) GC MARKING PROCESS ACCORDING TO AN EMBODIMENT
6. MISCELLANEOUS; EXTENSIONS
7. HARDWARE OVERVIEW

1. General Overview

A virtual machine executes an application and/or program by executing an intermediate representation of the source code, such as bytecode. An interpreter of the virtual machine converts the intermediate representation into machine code. As the application is executed, certain memory (also referred to as "heap memory") is allocated for objects created by the program. A garbage collection system may be used to automatically reclaim memory locations occupied by objects that are no longer being used by the application. A heap memory may be divided into multiple generations for purposes of storing the objects. In particular, the heap memory may include a portion designated as "young generation" for storing newly-created objects, and a portion designated as "old generation" for storing older objects. In embodiments, a multi-generational garbage collector may collect garbage by traversing the entire heap memory, or by traversing only a portion of the heap memory. For example, the garbage collector may traverse only portions of the heap memory designated as young generation.

One or more embodiments include performing garbage collection based on garbage collection states (also referred to as "colors") that are stored with heap references. A set of garbage collection (GC) states are used to track a progress of GC operations with respect to a heap reference. A heap reference includes an indication of a GC state associated with the heap reference.

A Garbage Collection (GC) cycle includes a marking phase. During the marking phase, the GC marks each live object with a "live" bit. The GC first selects a new marking parity. The GC then identifies a set of all roots (e.g., a set of pointers that directly reference objects in the program). The GC traverses the heap, beginning with the roots, operating concurrently with the mutator, marking each object as live by at least adjusting the color stored in the reference associated with the object to include the new marking parity. However, marking objects on the heap while running concurrently with the mutator threads is made more complicated because the structure of the heap may be altered by the mutator threads while the GC is traversing the heap. Snapshot-at-the-beginning (SATB) is a technique whereby the GC marks any object that is live at the beginning of the marking phase. This may cause objects that become no longer live during marking to still be marked as live, but prevents a situation where a live object is not marked One or more embodiments include implementing a reference write barrier when writing a reference onto heap memory. An application thread, which may run concurrently with a GC thread, requests to modify a reference in the heap memory. As discussed above, the heap reference includes "colors" that indicate a GC state at the time the heap reference was stored. The write barrier checks the colors of the reference before it is overwritten. If the colors of the reference do not match a good color indicated by the GC, the write barrier takes a slow path, which (a) logs the original contents of an object field inside the heap memory (e.g., immediately prior to receiving the write instruction) into a SATB-list and (b) modifies the reference received in the write instruction to include the good color, and (c) stores the modified reference (e.g., including the good color) to the heap. If the colors of the reference match a good color indicated by the GC, the write barrier takes a fast path which (a) writes the modified reference, including the good color, to the heap and (b) refrains from adding to the SATB-list. The GC processes the SATB-list by marking all objects in it, and traversing their references where necessary. When the GC completes both traversal of the heap and processing of the SATB-list, the GC has marked, as live, all objects that were live at the beginning of the marking phase. In this way, the write barrier can ensure that only the first write that modifies a reference will cause the GC to add an entry to the SATB-list.

One or more embodiments include implementing a reference load barrier when loading a reference from a heap memory to a call stack. An application thread, which may run concurrently with a GC thread, requests to load a reference from heap memory onto a call stack. A set of operations is performed on the reference from the heap memory that both (a) determines whether the GC state, indicated by the colors, is "good" relative to (e.g., matches at least a portion of) a current phase of a current GC cycle and (b) modifies the reference by removing the color from the reference. If the GC state indicated by the colors is not good, a set of GC operations are performed to bring the heap reference from the current state to the good GC state, and the heap reference is updated to indicate the good GC state. Thereafter, the modified reference is stored onto the call stack. The reference on the call stack, pointing to the same object as the heap reference, does not include any indication of any of a GC state.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
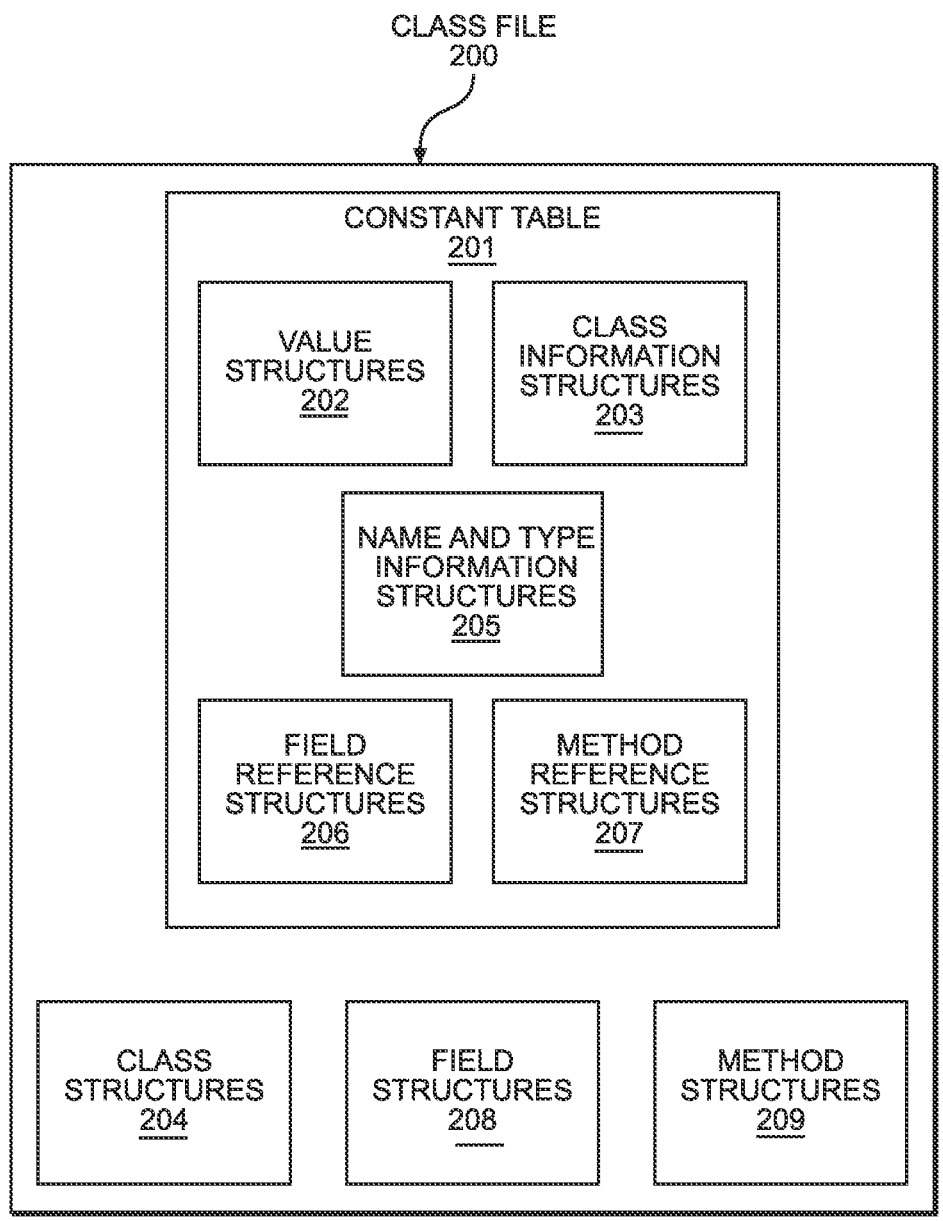
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13) ;
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
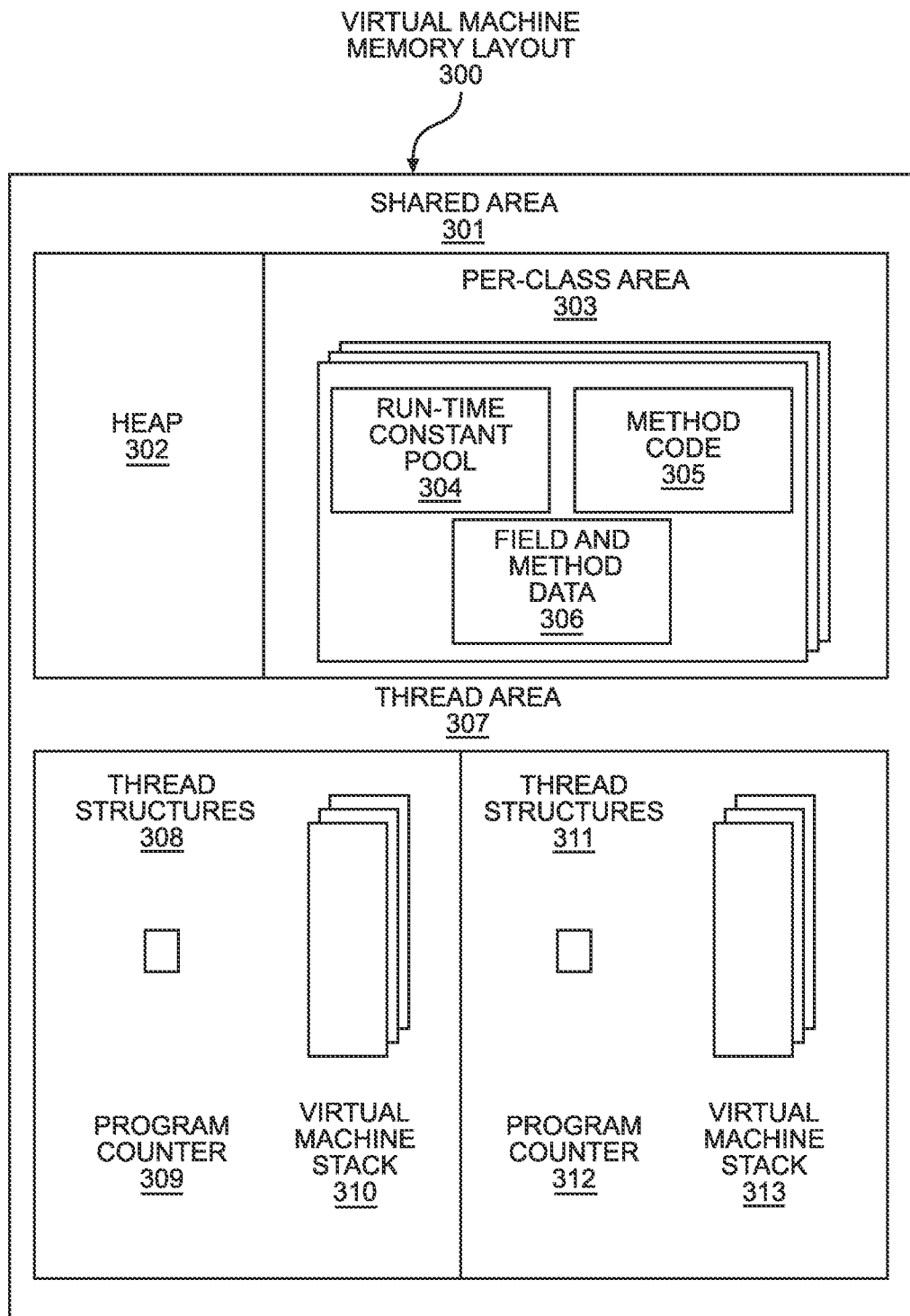
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
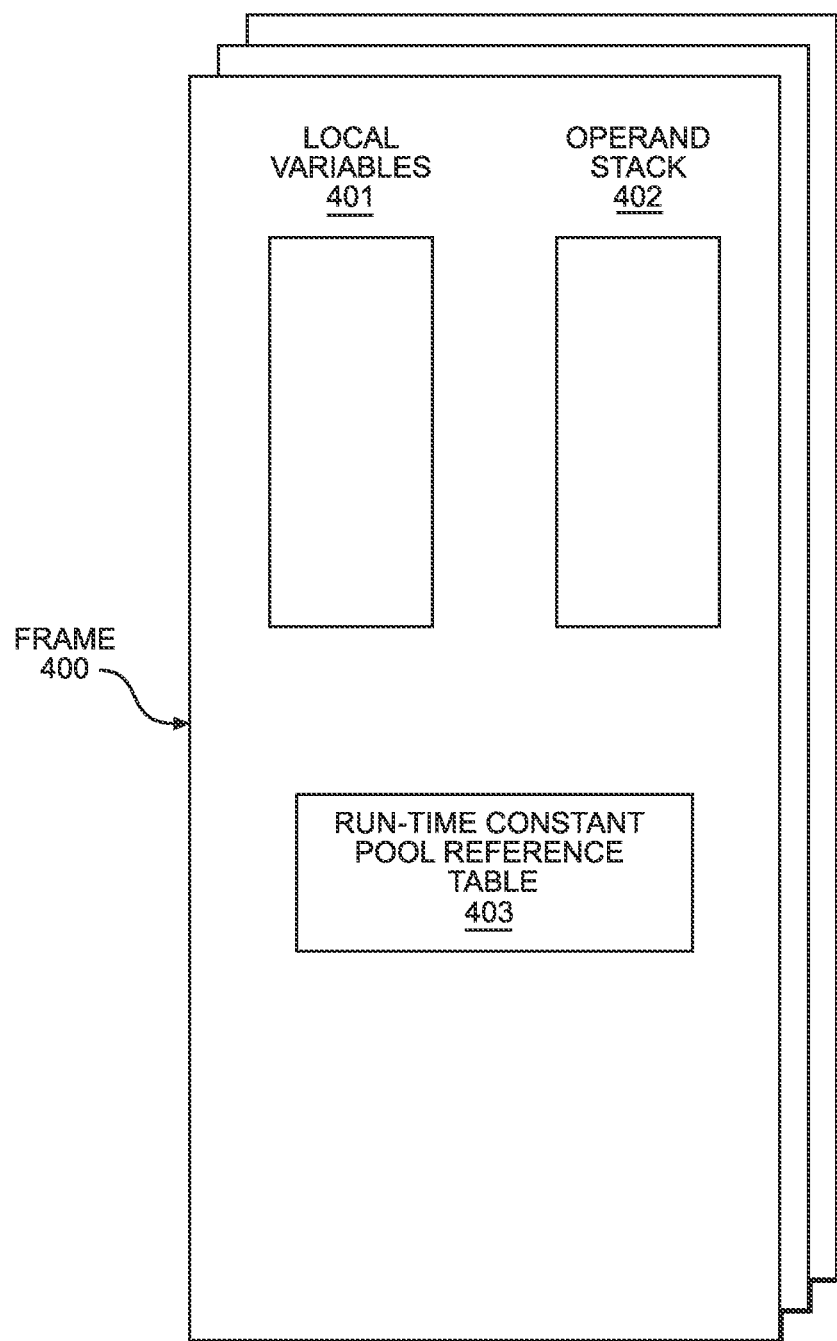
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Figure 5:
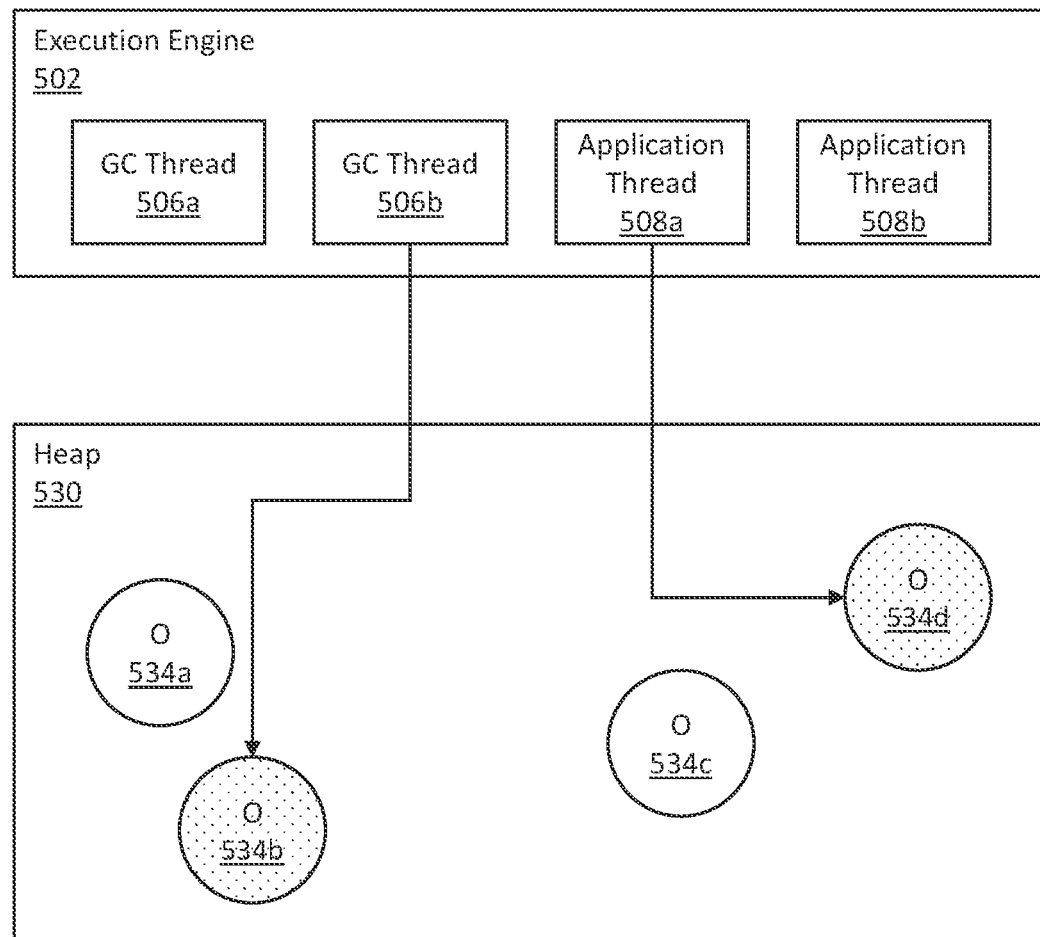
FIG. 5 illustrates an execution engine and a heap memory of a virtual machine according to an embodiment.

FIG. 5 illustrates an execution engine and a heap memory of a virtual machine according to an embodiment. As illustrated in FIG. 5, a system 500 includes an execution engine 502 and a heap 530. The system 500 may include more or fewer components than the components illustrated in FIG. 5. The components illustrated in FIG. 5 may be local to or remote from each other.

In one or more embodiments, a heap 530 represents the run-time data area from which memory for class instances and arrays is allocated. An example of a heap 530 is described above as heap 302 in FIG. 3.

A heap 530 stores objects 534a-d that are created during execution of an application. An object stored in a heap 530 may be a normal object, an object array, or another type of object. A normal object is a class instance. A class instance is explicitly created by a class instance creation expression. An object array is a container object that holds a fixed number of values of a single type. The object array is a particular set of normal objects.

A heap 530 stores live objects 534b, 534d (indicated by the dotted pattern) and unused objects 534a, 534c (also referred to as "dead objects," indicated by the blank pattern). An unused object is an object that is no longer being used by any application. A live object is an object that is still being used by at least one application. An object is still being used by an application if the object is (a) pointed to by a root reference or (b) traceable from another object that is pointed to by a root reference. A first object is "traceable" from a second object if a reference to the first object is included in the second object.

Sample code may include the following:

```
class Person {
    public String name;
    public int age;
    public static void main(String[ ] args) {
        Person temp = new Person ( ) ;
        temp.name = "Sean";
        temp.age = 3;
    }
}
```

An application thread 508a executing the above sample code creates an object temp in a heap 530. The object temp is of the type Person and includes two fields. Since the field age is an integer, the portion of the heap 530 that is allocated for temp directly stores the value "3" for the field age. Since the field name is a string, the portion of the heap 530 that is allocated for temp does not directly store the value for the name field; rather the portion of the heap 530 that is allocated for temp stores a reference to another object of the type String. The String object stores the value "Sean." The String object is referred to as being "traceable" from the Person object.

In one or more embodiments, an execution engine 502 includes one or more threads configured to execute various operations. As illustrated, for example, an execution engine 502 includes garbage collection (GC) threads 506a-b and application threads 508a-b.

In one or more embodiments, an application thread 508a-b is configured to perform operations of one or more applications. An application thread 508a-b creates objects during run-time, which are stored onto a heap 530. An application thread 508a-b may also be referred to as a "mutator," because an application thread 508a-b may mutate the heap 530 (during concurrent phases of GC cycles and/or between GC cycles).

In one or more embodiments, a GC thread 506a-b is configured to perform garbage collection. A GC thread 506a-b may iteratively perform GC cycles based on a schedule and/or an event trigger (such as when a threshold allocation of a heap (or region thereof) is reached). A GC cycle includes a set of GC operations for reclaiming memory locations in a heap that are occupied by unused objects.

In an embodiment, multiple GC threads 506a-b may perform GC operations in parallel. The multiple GC threads 506a-b working in parallel may be referred to as a "parallel collector."

In an embodiment, GC threads 506a-b may perform at least some GC operations concurrently with the execution of application threads 508a-b. The GC threads 506a-b that operate concurrently with application threads 508a-b may be referred to as a "concurrent collector" or "partially-concurrent collector."

In an embodiment, GC threads 506a-b may perform generational garbage collection. A heap is separated into different regions. A first region (which may be referred to as a "young generation space") stores objects that have not yet satisfied criteria for being promoted from the first region to a second region; a second region (which may be referred to as an "old generation space") stores objects that have satisfied the criteria for being promoted from the first region to the second region. For example, when a live object survives at least a threshold number of GC cycles, the live object is promoted from the young generation space to the old generation space.

Various different GC processes for performing garbage collection achieve different memory efficiencies, time efficiencies, and/or resource efficiencies. In an embodiment, different GC processes may be performed for different heap regions. As an example, a heap may include a young generation space and an old generation space. One type of GC process may be performed for the young generations space. A different type of GC process may be performed for the old generation space. Examples of different GC processes are described below.

As a first example, a copying collector involves at least two separately defined address spaces of a heap, referred to as a "from-space" and a "to-space." A copying collector identifies live objects stored within an area defined as a from-space. The copying collector copies the live objects to another area defined as a to-space. After all live objects are identified and copied, the area defined as the from-space is reclaimed. New memory allocation may begin at the first location of the original from-space.

Copying may be done with at least three different regions within a heap: an Eden space, and two survivor spaces, S1 and S2. Objects are initially allocated in the Eden space. A GC cycle is triggered when the Eden space is full. Live objects are copied from the Eden space to one of the survivor spaces, for example, S1. At the next GC cycle, live objects in the Eden space are copied to the other survivor space, which would be S2. Additionally, live objects in S1 are also copied to S2.

As another example, a mark-and-sweep collector separates GC operations into at least two stages: a mark stage and a sweep stage. During the mark stage, a mark-and-sweep collector marks each live object with a "live" bit. The live bit may be, for example, a bit within an object header of the live object. During the sweep stage, the mark-and-sweep collector traverses the heap to identify all non-marked chunks of consecutive memory address spaces. The mark-and-sweep collector links together the non-marked chunks into organized free lists. The non-marked chunks are reclaimed. New memory allocation is performed using the free lists. A new object may be stored in a memory chunk identified from the free lists.

A mark-and-sweep collector may be implemented as a parallel collector. Additionally or alternatively, a mark-andsweep collector may be implemented as a concurrent collector. Example phases within a GC cycle of a concurrent mark-and-sweep collector include:

Phase 1: Identify the objects referenced by root references (this is not concurrent with an executing application)

Phase 2: Mark reachable objects from the objects referenced by the root references (this may be concurrent)

Phase 3: Identify objects that have been modified as part of the execution of the program during Phase 2 (this may be concurrent)

Phase 4: Re-mark the objects identified at Phase 3 (this is not concurrent)

Phase 5: Sweep the heap to obtain free lists and reclaim memory (this may be concurrent)

As another example, a compacting collector attempts to compact reclaimed memory areas. A heap is partitioned into a set of equally sized heap regions, each a contiguous range of virtual memory. A compacting collector performs a concurrent global marking phase to determine the liveness of objects throughout the heap. After the marking phase completes, the compacting collector identifies regions that are mostly empty. The compacting collector collects these regions first, which often yields a large amount of free space. The compacting collector concentrates its collection and compaction activity on the areas of the heap that are likely to be full of reclaimable objects, that is, garbage. The compacting collector copies live objects from one or more regions of the heap to a single region on the heap, and in the process both compacts and frees up memory. This evacuation may be performed in parallel on multiprocessors to decrease pause times and increase throughput.

Example phases within a GC cycle of a concurrent compacting collector include:

Phase 1: Identify the objects referenced by root references (this is not concurrent with an executing application)

Phase 2: Mark reachable objects from the objects referenced by the root references (this may be concurrent)

Phase 3: Identify objects that have been modified as part of the execution of the program during Phase 2 (this may be concurrent)

Phase 4: Re-mark the objects identified at Phase 3 (this is not concurrent)

Phase 5: Copy live objects from a source region to a destination region, to thereby reclaim the memory space of the source region (this is not concurrent)

As another example, a load-barrier collector marks and compacts live objects but lazily remaps references pointing to the relocated objects. A load-barrier collector relies on "colors" embedded within references stored on the heap. A color represents a GC state, and tracks a progress of GC operations with respect to a reference. A color is captured by metadata stored within certain bits of a reference.

At every moment in time, all GC threads 506*a-b* agree on what color is the "good color," or "good GC state." A GC thread 506*a-b* loading a reference from a heap 530 to a call stack first applies a check to determine whether a current color of the reference is good. Similarly, an application thread 508*a-b* loading a reference from a heap 530 to a call stack first applies a check to determine whether a current color of the reference is good. The check may be referred to as a "load barrier." A good-colored reference will hit a fast path that incurs no additional work. Otherwise, the reference will hit a slow path. The slow path involves certain GC operations that bring the reference from the current GC state to the good GC state. The slot where the reference resides in the heap 530 is updated with a good-colored alias to avoid hitting the slow path subsequently (updating to a good color may also be referred to as "self-healing").

For example, a stale reference (a reference to an object that has been moved concurrently during compaction, meaning the address may point to an outdated copy of the object, or another object, or even nothing) is guaranteed to not have the good color. An application thread attempting to load the reference from a heap first executes a load barrier. Through the load barrier, the reference is identified as stale (not being of a good color). The reference is hence updated to point to the new location of the object and to be associated with the good color. The reference with the updated address and the good color is stored into the heap. The reference with the updated address may also be returned to the application thread. However, the reference returned to the application thread does not necessarily include any color.

Additional and/or alternative types of GC processes, other than those described above, may be used. Other types of GC processes may also rely on "colors" of references, or metadata relating to garbage collection stored within references.

In an embodiment, a color is stored with a heap reference but is not stored with a dereferenceable reference. The term "heap reference" refers to a reference stored on a heap 530. The term "dereferenceable reference" refers to a reference that an execution engine uses to access a value of an object being pointed to by the reference. Obtaining a value of an object being pointed to by a reference is referred to as "dereferencing" the reference. A GC thread 506*a-b* attempting to dereference a reference stored on a heap 530 first loads the reference from the heap 530 to a call stack of the GC thread 506*a-b*. An application thread 508*a-b* attempting to dereference a reference stored on a heap 530 first loads the reference from the heap 530 to a call stack of the application thread 508*a-b*. (For example, an application thread loads the reference into local variables 401, within frame 400, of a call stack, as described above with reference to FIG. 4.) Heap references and/or dereferenceable references are generally referred to herein as "references."

Figure 6:
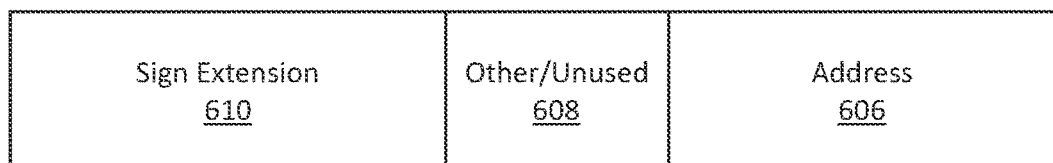
FIG. 6 illustrates a heap reference and a dereferenceable reference according to an embodiment.
Figure 6:
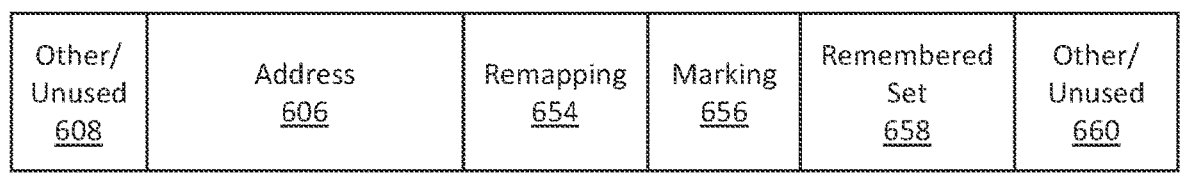

Referring to FIG. 6, FIG. 6 illustrates a heap reference and a dereferenceable reference according to an embodiment. A reference may include any number of bits, depending on the computing environment. In an Intel x86-64 machine, for example, a reference has 64 bits.

In an embodiment, a dereferenceable reference 600 includes a non-addressable portion 602 and an addressable portion 604. An addressable portion 604 defines the maximum address space that can be reached by the reference 600. Depending on the hardware system upon which an application executes, a non-addressable portion 602 may be required to comply with canonical form before the reference 600 is dereferenced. If such a requirement is imposed, the hardware system (such as a processor) generates an error when attempting to dereference a non-compliant dereferenceable reference. Hence, the non-addressable portion 602 of the reference 600 cannot be used for storing any GC-related metadata, such as GC states. In an Intel x86-64 machine, for example, an addressable portion of a reference has 48 bits, and a non-addressable portion has 16 bits. Based on the restrictions imposed by the hardware, a reference can reach at most $2^{48}$ unique addresses. Canonical form requires that the non-addressable portion be a sign extension 610 of the value stored in the addressable portion (that is, the high-order bits 48 through 63 must be copies of the value stored in bit 47).

As illustrated, addressable portion 604 includes address 606 and optionally other bits 608. The address 606 refers to the address of the object being pointed to by reference 600.

The other bits 608 may be unused. Alternatively, the other bits 608 may store metadata, which may be but is not necessarily related to garbage collection.

As described above, dereferenceable references 600 include references stored on call stacks. Additionally or alternatively, dereferenceable references 600 include references embedded within compiled methods stored on a code cache and/or other memory location. A compiled method is a method that has been converted from a higher-level language (such as bytecode) to a lower-level language (such as machine code). An application thread may directly access a compiled method within the code cache, or other memory location, to execute the compiled method. As an example, a compiled method may be generated by a JIT Compiler 109 of FIG. 1. As another example, a compiled method may be generated by another component of a virtual machine.

In an embodiment, a heap reference 650 includes transient color bits 652, address bits 606 and optionally other bits 608. Transient color 652 represents a GC state that tracks a progress of GC operations with respect to reference 650. Color 652 is "transient" because the color 652 need not stay with the reference when the reference is loaded from a heap 530 to a call stack. The other bits 608 may be unused. Alternatively, the other bits 608 may store metadata, which may be but is not necessarily related to garbage collection. In embodiments, the transient color 652 is stored in the lowest-order (right-most) bits of the heap reference 650. For example, the transient color 652 may be two bytes in length, and is stored in bits 0-15 of the heap reference 650.

In an embodiment, transient colors 652 include one or more remapping bits 654. In embodiments, the remapping bits 654 provide, for each generation of the GC, an indication of a current relocation phase of that generation in the GC. In embodiments, the GC includes two generations (e.g., a young generation and an old generation), and the remapping bits include a number of bits sufficient to describe the current relocation phase of both the young generation and the old generation. For example, the remapping bits may include 4 bits. In embodiments, the remapping bits 654 are stored in the highest-order portion of the transient color 652. For example, where the transient color 652 is stored in bits 0-15 of the heap reference 650, the remapping bits 654 may make up bits 12-15 of the heap reference 654.

The transient color 652 may optionally include additional color bits, including one or more marking bits 656, one or more remembered set bits 658, and one or more other bits 660. In an embodiment, the remapping bits 654 may represent a relocation phase of the GC. In a multi-generational GC, the remapping bits 654 may represent a relocation phase of each generation of the GC. The remapping bits will be described in greater detail below.

In an embodiment, the marking bits 656 may represent a marking parity of the GC. In a multi-generational GC, the marking bits 656 may include a representation of a marking parity of each generation of the GC. For example, in a GC that includes a young generation and an old generation, the marking bits 656 may include two bits for representation of a marking parity in the young generation and two bits for representation of a marking parity in the old generation.

In an embodiment, the remembered set bits 658 may represent a remembered set phase of the GC. As a particular example, the remembered set bits may be two bits, with a single bit being set representing a phase of the remembered set. The remembered set bits indicate potential references from the old generation into the young generation.

In embodiments the other bits 660 may be used to represent other features of the GC state. Alternatively, the other bits 660 may not be used. In some embodiments, a number of other bits 660 may be determined such that a number of bits in the transient colors 652 is a whole number of bytes (e.g., the number of bits is divisible by 8). For example, the number of bits in the transient colors 652 may be 8 bits or 16 bits. In still another embodiment, transient colors 652 may represent a different set of GC states altogether. Transient colors 652 may represent GC states used in additional and/or alternative types of GC processes.

In an embodiment, transient color 652 represents one set of GC states, while the other bits 608 represents another set of GC states. As an example, the other bits 608 may track an age of a reference (e.g., a number of GC cycles the reference has been through).

In embodiments, a GC cycle may include a plurality of phases. In some embodiments, a GC system may include separate GC cycles for each generation designated in the heap. For example, the GC system may include a young generation cycle and an old generation cycle. The young generation GC cycle may include the following phases: Mark Start, Concurrent Mark, Relocate Start, Concurrent Relocation. In some embodiments, the old generation GC cycle is symmetric to the young generation GC cycle, and may include the same phases. In some embodiments, each phase is executed concurrently, meaning that one or more application threads 508a, 508b may continue execution during the phase. In other embodiments, one or more of the phases (e.g., Mark Start, Relocate Start) may be non-concurrent. All application threads 508a-b must pause during a non-concurrent phase (also referred to as a "stop-the-world pause" or "STW pause"). In some embodiments, a GC cycle (e.g., a young generation GC cycle or an old generation GC cycle) begins when objects on the heap assigned to a particular generation exceed a storage threshold, or after a particular time period has elapsed without a GC cycle.

Detailed discussion of the phases follows. Additional and/or alternative operations, other than what is discussed below, may also be performed in each phase.

Mark Start: During the Mark Start phase, the GC updates one or more constants (e.g., the "good color") by updating a marking parity and/or a remembered set parity for the young generation. During Mark Start, the GC may capture a snapshot of the remembered set data structure.

Concurrent Mark: The GC threads 506a-b perform object graph traversal to identify and mark all live objects. The GC threads trace through a transitive closure of the heap 530, truncating any traversal that leads outside the young generation. If a stale reference is found in the heap 530 during this process, the reference is updated with the current address of the object it refers to. The reference in the heap 530 is also updated to indicate the good color.

Optionally, per-page liveness information (the total number and the total size of live objects on each memory page) is recorded. The liveness information may be used to select pages for evacuation.

Mark End: The GC threads 506a-b mark any enqueued objects and trace a transitive closure of the enqueued objects, and confirm that marking is complete.

Relocate Start: During Relocate Start, the GC updates one or more constants (e.g., the "good color") by updating at least the remapping bits. In an embodiment, the GC threads 506a-b select an empty region as a to-space. In another embodiment, additional and/or alternative methods may be used for selecting a to-space for the relocated objects.

Concurrent Relocation: Marked from-space objects may be relocated to the selected to-space (possibly with in-place compaction in particular situations). Every object that gets moved and contains a stale pointer into the currently relocating young generation gets added to the remembered set. This helps to ensure that pointers get remapped subsequently.

4. Load and Write Barriers

In one or more embodiments, a GC cycle includes one or more concurrent phases. During a concurrent phase, one or more application threads may execute concurrently with one or more GC threads. When an application thread attempts to load a reference from a heap to a call stack, the application thread may execute a reference load barrier. When an application thread attempts to write a reference onto a heap, the application thread may execute a reference write barrier.

Figure 7:
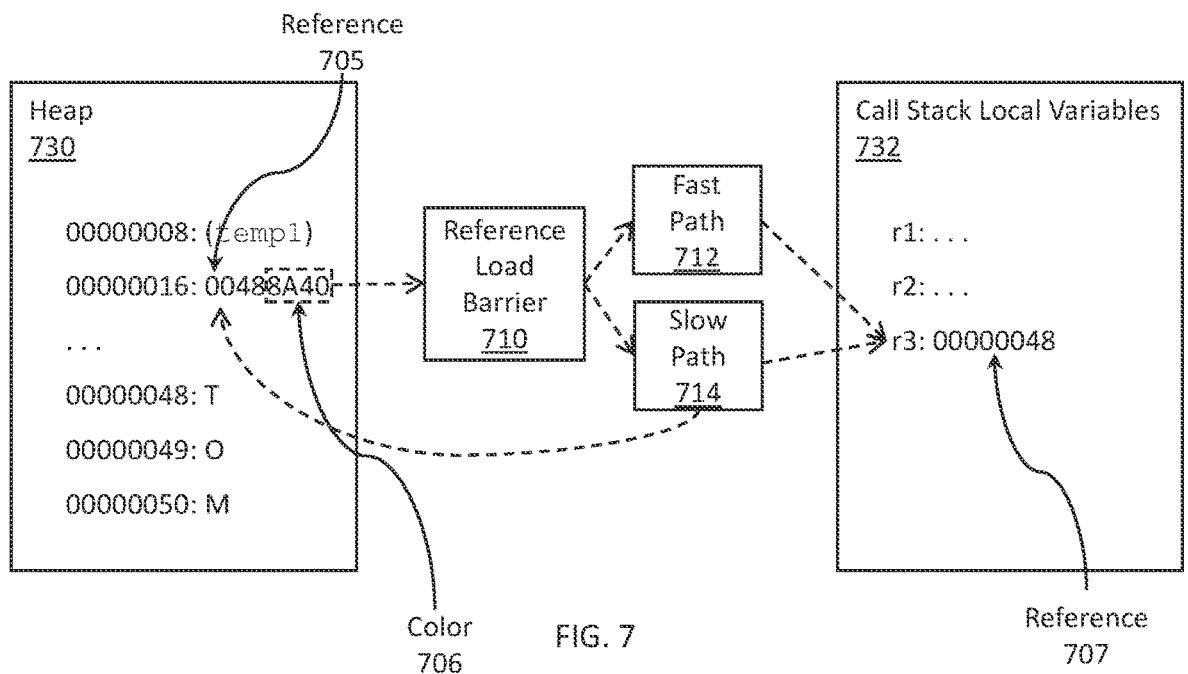
FIG. 7 illustrates a reference load barrier according to an embodiment.

FIG. 7 illustrates a reference load barrier according to an embodiment. As illustrated, a heap 730 includes addresses 00000008, 00000016, . . . 00000048, 00000049, 00000050. Call stack local variables 732 include registers r1, r2, r3. In the example, references include 32 bits. Colors of heap references may be indicated by bits 0-15. For example, the color may include 4 remapping bits (e.g., bits 12-15) for indicating relocation phases of a young generation and an old generation, 4 marking bits (e.g., bits 8-11) for indicating marking parity in a young generation and an old generation, two remembered set bits (e.g., bits 6-7) for indicating remembered set parity in a GC, and six other bits (bits 0-5) that may be unused or may store other metadata.

Regarding the remapping bits, the bits may use a coding such that exactly one bit, from among the four remapping bits, is set, with the one set bit indicating the relocation phases of both the old generation and the young generation. In particular, the four remapping bits can be represented as a four-digit binary number. For the remapping bits, the value 0001 may indicate that the old generation relocation is in an even phase and the young generation relocation is in an even phase; the value 0010 may indicate that the old generation relocation is in an even phase and the young generation relocation is in an odd phase; the value 0100 may indicate that the old generation relocation is in an odd phase and the young generation relocation is in an even phase; the value 1000 may indicate that the old generation relocation is in an odd phase and the young generation relocation is in an odd phase. Thus, the four possible values that include exactly one set bit represent each of the possible combinations of relocation phases within the old generation and the young generation.

The GC may also set a shift value that is one higher than a position of a particular bit, from among the remapping bits, that is set in the currently good color. This ensures that the particular bit is the last bit shifted out of the address. For example, given that the remapping bits are bits 12-15, the shift value may be set to a value between 13 and 16, where a value of 13 corresponds to the bit 12 being the set bit of the remapping bits, a value of 14 corresponds to the bit 13 being the set bit of the remapping bits, a value of 15 corresponds to the bit 14 being the set bit of the remapping bits, and a value of 16 corresponds to the bit 15 being the set bit of the remapping bits. In embodiments, the shift value changes at least at a start of each new GC relocation phase and may be set using, for example, compiled method entry barrier patching.

In embodiments, the address portion of a reference may overlap the color bits, beginning immediately following the set bit of the remapping bits. Accordingly, the address portion of the reference may begin anywhere between bit 13 and bit 16, depending on the position of the set bit in the remapping bits. However, any bits included within the overlap are set to zero. Accordingly, the method requires that the three lowest-order bits of each address be zero.

Sample code may include the following:

```
class Person {
    public String name;
    public static void main(String[ ] args) {
        Person temp1 = new Person ( ) ;
        . . .
        String temp2 = temp1.name;
    }
}
```

Based on the code line Person temp1=new Person ( ), an application thread creates a new object in a heap 730, and a reference temp1 refers to the new object. The object (referred to by temp1) is of the type Person and includes a name field of the type String. The object (referred to by temp1) is stored at address "00000008" within the heap 730. The name field of the object (referred to by temp1) is stored at address "00000016" within the heap 730. The name field is populated with a reference 705. The reference 705 includes a color 706 and points to address "0042." Hence, address "00000048" includes the value of the name of the object (referred to by temp1), and the value is "TOM."

Based on the code line String temp2=temp1.name, the application thread attempts to load the reference 705 in the name field of the object referred to by temp1. The application thread hits a reference load barrier 710. The reference load barrier 710 includes instructions to check whether the color 706 of the reference 705 includes remapping bits that match the current relocation phases of both the young generation and the old generation. In particular, the instructions determine whether the correct bit, from among the remapping bits, is set.

To accomplish this, a logical bit-wise right shift operation is applied to the reference 705. The system may shift the reference to the right n times, where n is equal to the shift value set by the GC. Each bit is shifted to the right n places, and n bits having a default value are inserted in the left-most (e.g., highest-order) bits. For example, if a canonical form would require that the highest-order bits are 0s, the shift operation may insert n 0s into the left-most bits. Because the color 706 is stored in the lowest-order (right-most) bits of the reference 705, the right shift operation applied to the reference has the effect of removing the color bits 706. Moreover, because the remapping bits are stored at the highest-order portion of the color, the remapping bits are the last one or more bits removed by the right shift operation. In particular, the shift value set by the GC corresponds to the position of the exactly one bit, of the remapping bits, that is set in the current "good color."

The system may then determine if the last bit shifted out of the reference was set (e.g., indicating that the correct bit of the remapping bits is set). For example, in an x86-64 architecture, the system may determine if the carry flag and zero flags are set. After a bit-wise right shift operation, the carry flag is equal to the last bit shifted out of the reference, and the zero flag is set if all bits in the reference, after the shift operation is completed, are 0. Accordingly, the carry flag is set when the correct bit, of the remapping bits, is set; the zero flag is set when the reference is a reference to a null value (e.g., the address 0). If the carry flag is not set and the zero flag is not set, the application thread takes a slow path 714. In other cases (e.g., the carry flag is set, or the zero flag is set), the application thread takes a fast path 712.

The fast path 712 does not necessarily involve any GC operations, such as remapping references and/or marking objects as live. The color 706 has been removed from the reference 705 by the right shift operation. The result "00000048" is saved as reference 707 in the call stack local variables 732, such as at r3. The application thread may then dereference the reference 707. The application thread accesses the address indicated by the reference 707, that is address "00000048" within the heap 730. The application thread obtains the value "TOM" at address "00000048" within the heap 730.

When the system determines that the application thread should take a slow path, the application thread may select one of a pool of slow paths. In particular, the application thread may reload the reference and select a slow path from the pool of slow paths based on the color 706. The application thread may, for example, remap an address indicated by the reference 705. The application may, for example, mark an object pointed to by the reference 705 as live. Then the application thread may update the color 706 of the reference 705 to be the good color. Additionally the application thread may remove the color 706 from the reference 705 for storage in the call stack local variables 732, as described above. In particular, the application thread may apply a logical bit-wise right shift operation to the reference 705. The system may shift the reference to the right n times, where n is equal to the shift value set by the GC.

Figure 8:
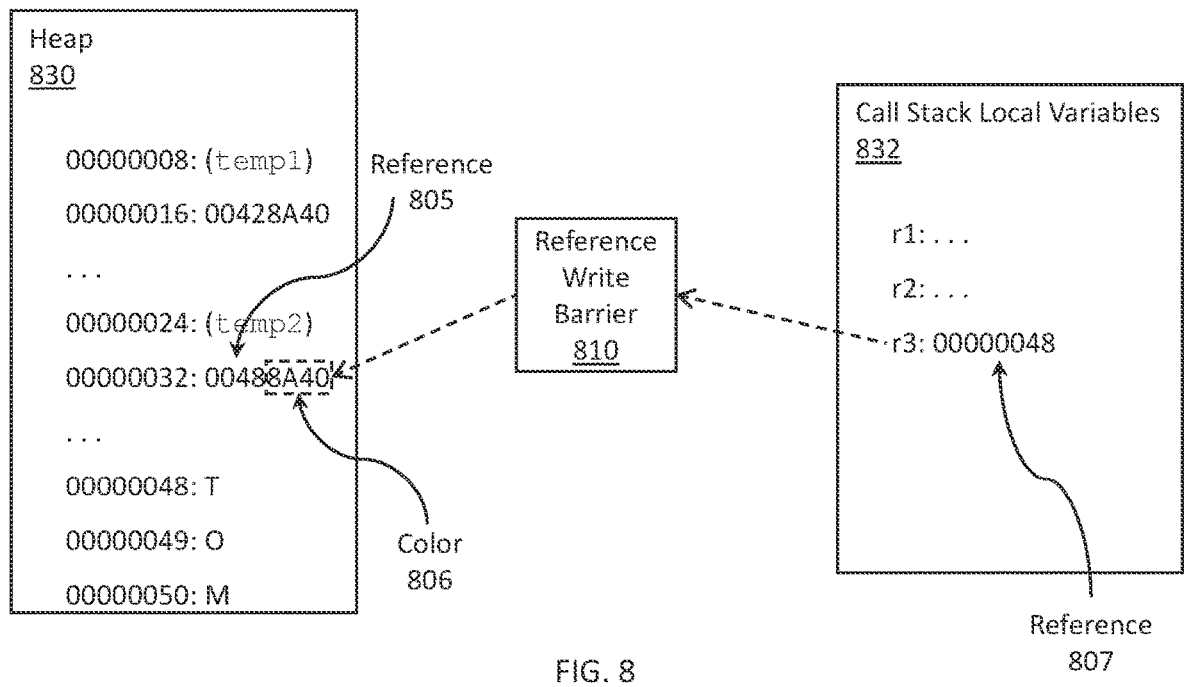
FIG. 8 illustrates a reference write barrier according to an embodiment.

FIG. 8 illustrates a reference write barrier according to an embodiment. As illustrated, a heap 830 includes addresses 00000008, 00000016, . . . 00000024, 00000032, . . . 00000048. Call stack local variables 832 include registers r1, r2, r3. In the example, references include 32 bits. Colors of heap references may be indicated by bits 0-15.

Sample code may include the following:

```
class Person {
    public String name;
    public static void main(String[ ] args) {
        Person temp1 = new Person ( );
        Person temp2 = new Person ( );
        . . .
        String temp3 = temp1.name;
        temp2.name = temp3;
    }
}
```

Based on the code line Person temp2=new Person ( ), an application thread creates a new object in a heap 830, and a reference temp2 refers to the new object. The object (referred to by temp2) is of the type Person and includes a name field of the type String. The object (referred to by temp2) is stored at address "00000024" within the heap 830. The name field of the object (referred to by temp2) is stored at address "00000032" within the heap 830. The name field is populated with a reference 805.

Based on the code line temp2.name=temp3, the application thread attempts to write a reference 807 from call stack local variables 832 into the heap 830. In particular, the application thread attempts to write the reference 807 to address "00000032," the location where the name field for the object referred to by temp2 is stored.

The application thread hits a reference write barrier 810. In particular, the application thread determines which color is currently the good color based on the current GC phase. The reference write barrier 810 includes instructions to determine if at least a portion of the color 806 of the reference 805 that is to be modified is a "good" color. The write barrier causes the application thread to compare at least an indication of a marking parity stored in the color 806 of the reference 805 to a current marking parity indicated by the GC (e.g., by the determined currently good color). In some embodiments, the write barrier also causes a comparison of additional GC states, including comparing a remembered set parity indicated by the color 806 and a current remembered set parity specified by the GC (e.g., by the determined currently good color). In some cases, the write barrier may determine if the entirety of the color 806 matches a "good" color specified by the GC. As a particular example, the write barrier may cause the application thread to perform a bitwise comparison operation, to compare a particular number of bits (e.g., a byte, a word) from the reference with a good color stored as a constant by the GC. In other embodiments, the write barrier may cause the application thread to execute a test instruction on the color 806 of the reference 805 and a bitwise complement of the "good" color specified by the GC.

If the write barrier determines that the tested portion of the color 806 of the reference 805 does not match the good color specified, by the GC, the write barrier may cause the application to write the reference 805 to a data structure. The data structure may be, for example, a linked list. The reference may be enqueued for analysis by the GC. In particular, the GC can traverse the references in the data structure as part of a marking process.

If the write barrier determines that the tested portion of the color 806 of the reference 805 matches the good color specified, by the GC. The write barrier may cause the system to refrain from adding a reference to the data structure.

The write barrier may further cause the application thread to tint the reference 807 with the good color. Tinting the reference 807 with the good color may include: (a) applying a bitwise left shift operation to the reference to shift the reference to the left n times, where n is equal to the shift value set by the GC and insert n 0s in the lowest-order bits of the reference, and (b) applying a logical bit-wise OR to the result of the left shift and a good color bit mask that includes the good color set by the GC in the lowest-order bits (e.g., bits 0-15) and a 0 in each other bit. The result of the OR is "00488A40." The application thread writes the result "00488A40" to the address "00000032" in the heap 830.

Figure 9:
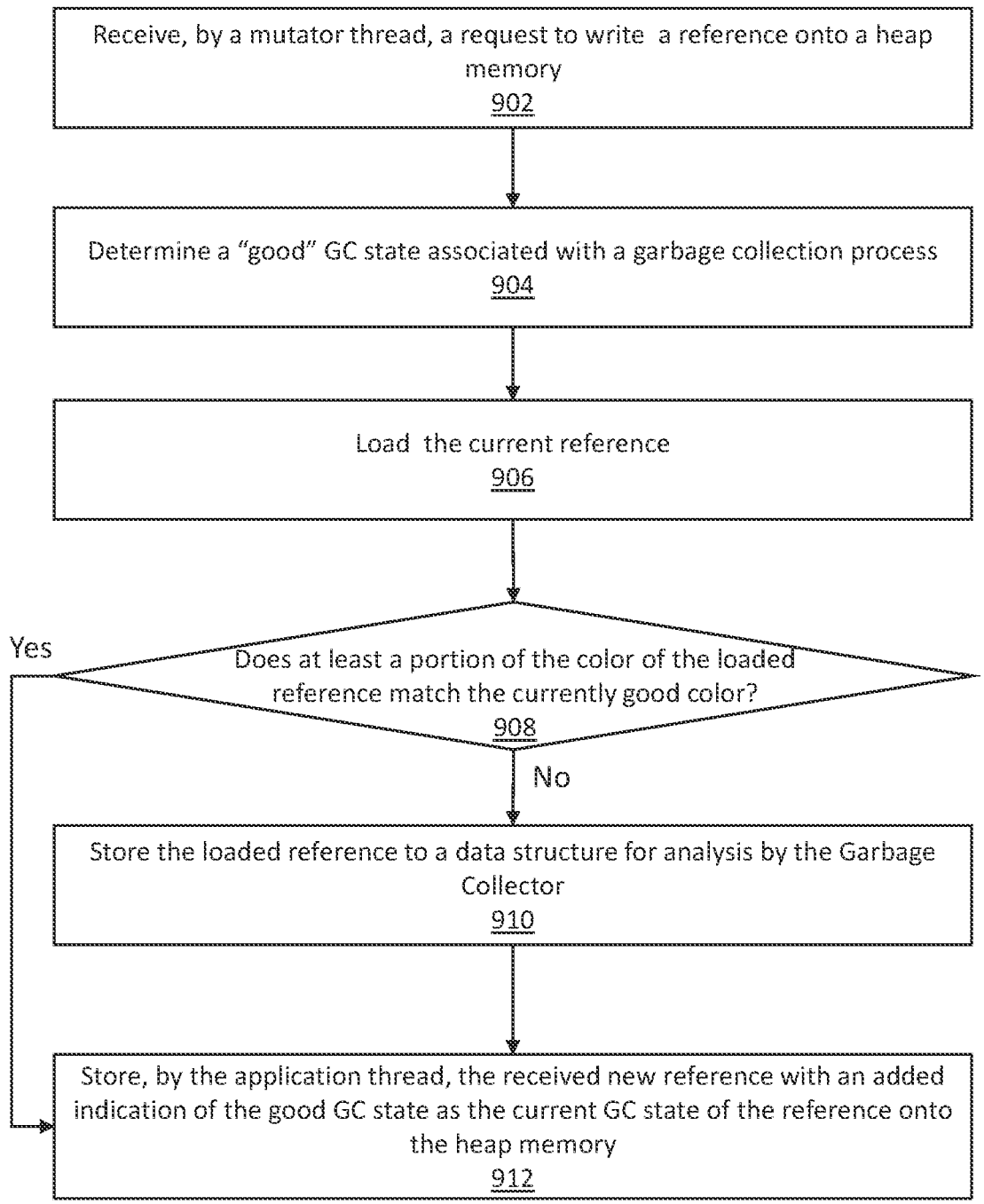
FIG. 9 illustrates a set of operations for using a write barrier when writing a heap reference by an application thread to improve a snapshot-at-the-beginning (SATB) GC marking process according to an embodiment.

6. Write Barrier for Writing a Heap Reference to Improve A Snapshot at the Beginning Garbage Collection Marking Process FIG. 9 illustrates a set of operations for using a write barrier when writing a heap reference by an application thread to improve a snapshot-at-the-beginning (SATB) GC marking process according to an embodiment. One or more operations illustrated in FIG. 9 may be modified, rearranged, or omitted all together. Accordingly, the particular sequence of operations illustrated in FIG. 9 should not be construed as limiting the scope of one or more embodiments. The operations as illustrated in FIG. 9 does not limit the way the operations are expressed in a set of code. Multiple operations of FIG. 9 may correspond to a single instruction in a set of code; conversely, a single operation of FIG. 9 may correspond to multiple instructions in a set of code. The operations of FIG. 9 are described as being executed by a single application thread; however, the operations may be executed by multiple application threads and/or GC threads.

A GC may initiate execution of a marking process for marking objects stored in at least a portion of the heap as live. The marking process may mark, for example, objects stored in a young generation portion of the heap, object stored in an old generation portion of the heap, or objects stored in any portion of the heap. At a beginning of the marking process, the GC may specify a current "good" color for the GC. In particular, the "good" color may make changes to at least a marking parity. In cases where the GC is marking the entire heap, the GC may change a marking parity for both the old generation and the young generation. In cases where the GC is marking objects stored in the young generation portion of the heap, the GC may update a marking parity of the young generation. In cases where the GC is marking objects stored in the old generation portion of the heap, the GC may update a marking parity of the old generation. In embodiments the GC may store the current "good" color as one or more constants accessible to an application thread using, for example, compiled method entry barrier patching.

During execution of the marking process, one or more embodiments include receiving, by a mutator (application) thread, a request to write a reference onto a heap memory (Operation 902). An application thread executes a set of code (for example, bytecode). The set of code includes a request to write a reference onto a heap memory. The request may be, for example, to write a reference stored on a call stack of the application thread onto a heap memory. In embodiments, the request may be to overwrite a value currently stored at a particular address with a new value.

Responsive to receiving the request, the write barrier may cause the application thread to determine at least a marking parity for the plurality of objects being traversed by the garbage collection marking process (Operation 904). In embodiments, the application thread may determine more information. For example, the application thread may determine a marking parity for all generations of the GC. The application thread may determine additional GC state information, such as a remembered set parity. In embodiments, the application thread may determine the current "good" color of the GC. In embodiments, the determination comprises the GC storing the value to a constant accessible by the application thread.

The write barrier may cause the application thread to load the reference stored at the particular address of the heap (Operation 906). As discussed above, the reference includes a transient color portion that stores information that indicates a state of the GC.

The application thread may compare a portion of the loaded current reference (from Operation 906) to the GC determined GC state information (of Operation 904) to determine if the portion of the current reference matches the determined GC state information (Operation 908). The write barrier causes the application thread to compare at least an indication of a marking parity stored in the loaded color portion of the current reference to a current marking parity indicated by the determined GC state information. In some embodiments, the write barrier causes a comparison of additional GC states, including comparing a remembered set parity stored in the loaded color portion of the current reference and a current remembered set parity indicated by the determined GC state information.

In some cases, the write barrier may cause the system to compare the entirety of the color information from the current reference and the current "good" color specified by the GC. As a particular example, the write barrier may cause the application thread to perform a bitwise comparison operation, to compare (e.g., using a test instruction) a particular number of bits (e.g., a byte, a word) from the loaded current reference with the current "good" color specified by the GC. As another example, the write barrier may cause the application thread to execute a test instruction on the loaded color portion of the current reference and a bitwise complement of the current "good" color specified by the GC.

If the comparison indicates that the loaded portion of the current reference matches the determined GC state information (YES in Operation 908), this indicates that the current write targeting the address of the reference is not the first write to target the address since the marking phase began. One or more embodiments include storing the reference to the heap memory (Operation 912). The application thread takes a "fast path," which involves skipping operations, such as refraining from storing the loaded current reference to a SATB data structure for use by the GC. Instead, the application thread directly executes Operation 912, which is further discussed below.

If the comparison indicates that the loaded portion of the current reference does not match the determined GC state information (NO in Operation 908), this indicates that the current write targeting the address of the reference is the first write to target the address since the marking phase began. The system write barrier may cause the application thread to store the loaded current reference to a SATB data structure for analysis by the GC (Operation 910). In particular, the GC may traverse the references in the data structure as part of the marking process. For example, the GC marking process may include traversing a transitive closure of the references stored in the data structure. In embodiments, the SATB data structure is a linked list that stores references.

Thereafter, the write barrier may cause the application thread to store the reference from the call stack to the heap memory (Operation 912). In an embodiment, the reference from the call stack does not have any indication of which GC state is a current GC state of the reference. The reference does not include any information or metadata indicating a progress of GC operations with respect to the reference. In another embodiment, the reference does not have any indication of which of a set of mutually exclusive GC states is a current GC state of the reference; however, the reference may include information on other GC states (for example, an age of the reference). In an embodiment, the reference to be written may have been previously dereferenced (by the application thread currently attempting to write the reference to the heap memory and/or another thread).

The application thread may create a good bit mask that includes, in the lowest-order bits, the determined "good" GC state, and includes a 0 in all other bits. One or more embodiments include the application thread storing the reference (with an added indication of the good GC state as the current GC state of the reference) onto the heap memory. The application thread retrieves a reference from the call stack, and adds an indication of the good GC state as the current GC state of the reference. For example, the application thread may apply a logical bitwise left shift operation to the reference from the call stack. The bitwise left shift operation causes the bits of the reference to be shifted left n times, where n is equal to the good shift value. The application thread may perform a logical OR of the shifted reference and the good bit mask. The application stores, onto the heap memory, the reference that includes the indication of the current GC state of the reference.

In this way, the write barrier may limit writes to the SATB data structure, such that only a first write to a particular reference causes a reference to be added to the data structure. This ensures that all objects stored to the heap can be marked as live during a GC marking process, while limiting the number of references included in the SATB data structure.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
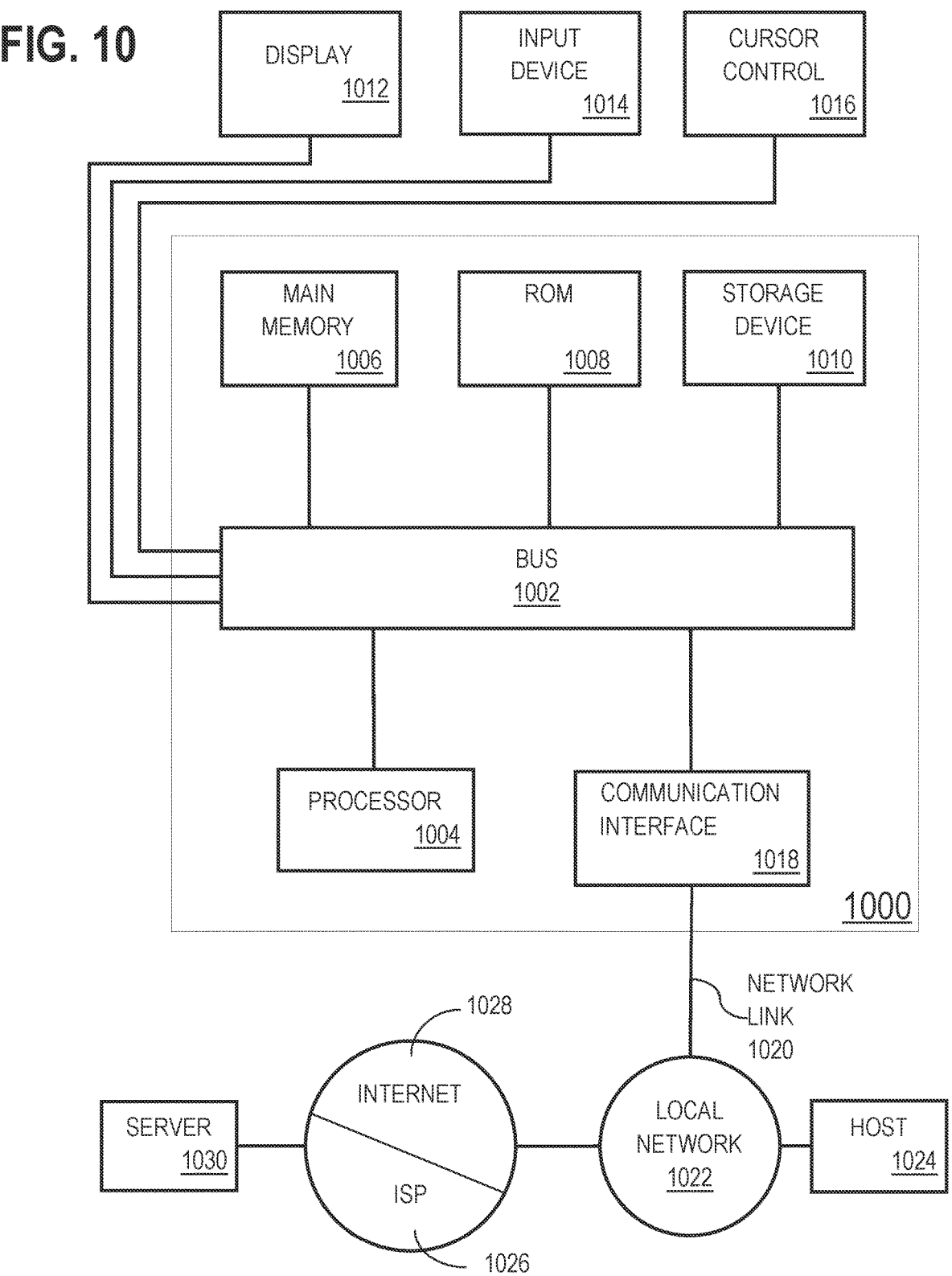
FIG. 10 illustrates a system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, causes performance of operations comprising:
   initiating execution of a garbage collection marking process for a plurality of objects in a heap memory;
   while the garbage collection marking process is executing:
      receiving a first request, from a first mutator thread, to overwrite a first reference field of an object of the plurality of objects, the object comprising at least a first reference and the first request comprising a second reference to be written to the first reference field;
   responsive to receiving the first request:
      determining a current marking parity for the plurality of objects being traversed by the garbage collection marking process;
      loading the first reference from the heap, the first reference comprising marking metadata;
      determining that the marking metadata of the first reference does not match the current marking parity;
      responsive to determining that the marking metadata of the first reference does not match the current marking parity:
         adding the first reference to a marking list for analysis by the garbage collection marking process;
         modifying the second reference to include the current marking parity as the marking metadata;
         storing the modified second reference to the first reference field.

2. The medium of claim 1, the operations further comprising:
   while the garbage collection marking process is executing:
   receiving a second request, from a second mutator thread, to overwrite the first reference field of the object, the second request received subsequent to the first request and comprising at least a third reference to be written to the first reference field;
   responsive to receiving the second request:
      determining the current marking parity for the plurality of objects being traversed by the garbage collection marking process;
      loading a second reference from the heap, the second reference comprising marking metadata;
      determining that the marking metadata of the second reference matches the current marking parity;
      responsive to determining that the marking metadata of the second reference matches the current marking parity:
         refraining from adding the second reference to the marking list;
         modifying the third reference to include the current marking parity as the marking metadata;
         storing the modified third reference to the first reference field.

3. The media of claim 1, wherein determining that the marking metadata of the first reference does not match the current marking parity comprises performing a bitwise compare operation of a metadata portion of the first reference and marking parity information provided by the garbage collection process.

4. The media of claim 1, wherein modifying the second reference to include the current marking parity as the marking metadata comprises:
   executing a bitwise shift operation on the second reference, the bitwise shift operation (a) removing a particular number of bits from a highest order portion of the second reference, and (b) inserting the particular number of bits having a default value at the lowest-order portion of the second reference; and
   performing a bitwise logical operation on the second reference to overwrite the particular number of bits inserted into the lowest-order portion of the second reference with the current marking parity.

5. The media of claim 4, wherein the particular number of bits is specified by the garbage collection process.

6. The media of claim 1, wherein the current marking parity is specified by the garbage collection process.

7. The media of claim 1, wherein the garbage collection process is a multi-generational garbage collection process including a young generation and an old generation, and wherein the current marking parity comprises a current young generation marking parity and a current old generation marking parity.

8. A method comprising:
initiating execution of a garbage collection marking process for a plurality of objects in a heap memory;
while the garbage collection marking process is executing:
receiving a first request, from a first mutator thread, to overwrite a first reference field of an object of the plurality of objects, the object comprising at least a first reference and the first request comprising a second reference to be written to the first reference field;
responsive to receiving the first request:
determining a current marking parity for the plurality of objects being traversed by the garbage collection marking process;
loading the first reference from the heap, the first reference comprising marking metadata;
determining that the marking metadata of the first reference does not match the current marking parity;
responsive to determining that the marking metadata of the first reference does not match the current marking parity:
adding the first reference to a marking list for analysis by the garbage collection marking process;
modifying the second reference to include the current marking parity as the marking metadata;
storing the modified second reference to the first reference field,
wherein the method is performed by at least one device including a hardware processor.

9. The method of claim 8, further comprising:
while the garbage collection marking process is executing:
receiving a second request, from a second mutator thread, to overwrite the first reference field of the object, the second request received subsequent to the first request and comprising at least a third reference to be written to the first reference field;
responsive to receiving the second request:
determining the current marking parity for the plurality of objects being traversed by the garbage collection marking process;
loading a second reference from the heap, the second reference comprising marking metadata;
determining that the marking metadata of the second reference matches the current marking parity;
responsive to determining that the marking metadata of the second reference matches the current marking parity:
refraining from adding the second reference to the marking list;
modifying the third reference to include the current marking parity as the marking metadata;
storing the modified third reference to the first reference field.

10. The method of claim 8, wherein determining that the marking metadata of the first reference does not match the current marking parity comprises performing a bitwise compare operation of a metadata portion of the first reference and marking parity information provided by the garbage collection process.

11. The method of claim 8, wherein modifying the second reference to include the current marking parity as the marking metadata comprises:
executing a bitwise shift operation on the second reference, the bitwise shift operation (a) removing a particular number of bits from a highest order portion of the second reference, and (b) inserting the particular number of bits having a default value at the lowest-order portion of the second reference; and
performing a bitwise logical operation on the second reference to overwrite the particular number of bits inserted into the lowest-order portion of the second reference with the current marking parity.

12. The method of claim 11, wherein the particular number of bits is specified by the garbage collection process.

13. The method of claim 8, wherein the current marking parity is specified by the garbage collection process.

14. The method of claim 8, wherein the garbage collection process is a multi-generational garbage collection process including a young generation and an old generation, and wherein the current marking parity comprises a current young generation marking parity and a current old generation marking parity.

15. A system comprising:
at least one device including a hardware processor;
the system being configured to perform operations comprising:
initiating execution of a garbage collection marking process for a plurality of objects in a heap memory;
while the garbage collection marking process is executing:
receiving a first request, from a first mutator thread, to overwrite a first reference field of an object of the plurality of objects, the object comprising at least a first reference and the first request comprising a second reference to be written to the first reference field;
responsive to receiving the first request:
determining a current marking parity for the plurality of objects being traversed by the garbage collection marking process;
loading the first reference from the heap, the first reference comprising marking metadata;
determining that the marking metadata of the first reference does not match the current marking parity;
responsive to determining that the marking metadata of the first reference does not match the current marking parity:
adding the first reference to a marking list for analysis by the garbage collection marking process;
modifying the second reference to include the current marking parity as the marking metadata;
storing the modified second reference to the first reference field.

16. The system of claim 15, the operations further comprising:
while the garbage collection marking process is executing:
receiving a second request, from a second mutator thread, to overwrite the first reference field of the object, the second request received subsequent to the first request and comprising at least a third reference to be written to the first reference field;
responsive to receiving the second request:

determining the current marking parity for the plurality of objects being traversed by the garbage collection marking process;

loading a second reference from the heap, the second reference comprising marking metadata;

determining that the marking metadata of the second reference matches the current marking parity;

responsive to determining that the marking metadata of the second reference matches the current marking parity:

refraining from adding the second reference to the marking list;

modifying the third reference to include the current marking parity as the marking metadata;

storing the modified third reference to the first reference field.

17. The system of claim 15, wherein determining that the marking metadata of the first reference does not match the current marking parity comprises performing a bitwise compare operation of a metadata portion of the first reference and marking parity information provided by the garbage collection process.

18. The system of claim 15, wherein modifying the second reference to include the current marking parity as the marking metadata comprises:

executing a bitwise shift operation on the second reference, the bitwise shift operation (a) removing a particular number of bits from a highest order portion of the second reference, and (b) inserting the particular number of bits having a default value at the lowest-order portion of the second reference; and performing a bitwise logical operation on the second reference to overwrite the particular number of bits inserted into the lowest-order portion of the second reference with the current marking parity.

19. The system of claim 18, wherein the particular number of bits is specified by the garbage collection process.

20. The system of claim 15, wherein the current marking parity is specified by the garbage collection process.

21. The system of claim 15, wherein the garbage collection process is a multi-generational garbage collection process including a young generation and an old generation, and wherein the current marking parity comprises a current young generation marking parity and a current old generation marking parity.

* * * * *

UNITED STATES PATENT AND TRADEMARK OFFICE
CERTIFICATE OF CORRECTION

| | |
|---|---|
| PATENT NO. | : 11,734,171 B2 |
| APPLICATION NO. | : 17/303635 |
| DATED | : August 22, 2023 |
| INVENTOR(S) | : Österlund et al. |

It is certified that error appears in the above-identified patent and that said Letters Patent is hereby corrected as shown below:

In the Specification

In Column 3, Line 44, delete "marked" and insert -- marked. --, therefor.

In the Claims

In Column 28, in Claim 2, Line 21, delete "medium" and insert -- media --, therefor.

Signed and Sealed this
First Day of October, 2024

Katherine Kelly Vidal
*Director of the United States Patent and Trademark Office*